(12) United States Patent
Futa et al.

(10) Patent No.: US 7,813,512 B2
(45) Date of Patent: Oct. 12, 2010

(54) ENCRYPTED COMMUNICATION SYSTEM AND COMMUNICATION DEVICE

(75) Inventors: Yuichi Futa, Osaka (JP); Masato Yamamichi, Ota (JP); Masami Yamamichi, legal representative, Ota (JP); Satomi Yamamichi, legal representative, Ota (JP); Keiko Yamamichi, legal representative, Maebashi (JP); Motoji Ohmori, Hirakata (JP); Makoto Tatebayashi, Takarazuka (JP)

(73) Assignee: Panasonic Corporation, Osaka (JP)

( * ) Notice: Subject to any disclaimer, the term of this patent is extended or adjusted under 35 U.S.C. 154(b) by 140 days.

(21) Appl. No.: 10/573,684

(22) PCT Filed: Oct. 18, 2004

(86) PCT No.: PCT/JP2004/015752

§ 371 (c)(1),
(2), (4) Date: Jan. 4, 2007

(87) PCT Pub. No.: WO2005/039100

PCT Pub. Date: Apr. 28, 2005

(65) Prior Publication Data

US 2007/0150735 A1    Jun. 28, 2007

(30) Foreign Application Priority Data

Oct. 16, 2003 (JP) .............................. 2003-356073

(51) Int. Cl.
*H04L 9/08* (2006.01)

(52) U.S. Cl. ...................... 380/285; 713/169; 713/171

(58) Field of Classification Search ...................... None
See application file for complete search history.

(56) References Cited

U.S. PATENT DOCUMENTS 4,918,728 A * 4/1990 Matyas et al. ............... 380/280

(Continued)

FOREIGN PATENT DOCUMENTS

WO    WO03063409 A2 *    7/2003

OTHER PUBLICATIONS

Bellare, M., Canetti, R., Krawczyk, H.: Keying Hash Functions for Message Authentication. In Koblitz, N., ed.: CRYPTO. vol. 1109 of Lecture Notes in Computer Science., Springer (1996) 1-15.*

(Continued)

*Primary Examiner*—William R Korzuch
*Assistant Examiner*—Michael R Vaughan
(74) *Attorney, Agent, or Firm*—Wenderoth, Lind & Ponack, L.L.P.

(57) ABSTRACT

In an encrypted communication system that includes a first and a second device, the first device encrypts a 1st key using a public key of the second device to generate 1st encrypted data, which is then transmitted to the second device, receives 2nd encrypted data from the second device, which is then decrypted using a secret key of the first device to obtain a 2nd key, and generates, based on the 1st and 2nd keys, a 1st encryption key for use in communication with the second device. The second device encrypts a 3rd key using a public key of the first device to generate the 2nd encrypted data, which is then transmitted to the first device, receives the 1st encrypted data, which is then decrypted using a secret key of the second device to obtain a 4th key, and generates, based on the 3rd and 4th keys, a 2nd encryption key for use in communication with the first device. The first and second devices perform encrypted communication using the 1st and 2nd encryption keys.

3 Claims, 9 Drawing Sheets

U.S. PATENT DOCUMENTS

| | | | |
|---|---|---|---|
| 5,371,794 A | | 12/1994 | Diffie et al. |
| 5,450,493 A | * | 9/1995 | Maher .......................... 380/30 |
| 5,850,443 A | | 12/1998 | Van Oorschot et al. ...... 380/285 |
| 5,953,420 A | * | 9/1999 | Matyas et al. ................ 713/171 |
| 6,028,937 A | | 2/2000 | Tatebayashi et al. ......... 713/169 |
| 6,081,601 A | * | 6/2000 | Raivisto ..................... 380/270 |
| 6,252,959 B1 | * | 6/2001 | Paar et al. ...................... 380/28 |
| 7,120,249 B2 | * | 10/2006 | Roberts ......................... 380/44 |
| 7,302,709 B2 | * | 11/2007 | England et al. ............... 726/27 |
| 7,373,517 B1 | * | 5/2008 | Riggins ....................... 713/184 |
| 7,480,939 B1 | * | 1/2009 | Nessett et al. ................. 726/22 |
| 2001/0042204 A1 | * | 11/2001 | Blaker et al. ................ 713/165 |
| 2002/0104001 A1 | | 8/2002 | Lotspiech et al. |
| 2003/0041242 A1 | * | 2/2003 | Patel .......................... 713/170 |
| 2003/0041253 A1 | * | 2/2003 | Matsui et al. ............... 713/189 |
| 2003/0093669 A1 | * | 5/2003 | Morais et al. ............... 713/163 |
| 2003/0204743 A1 | * | 10/2003 | Devadas et al. ............. 713/200 |
| 2004/0249974 A1 | * | 12/2004 | Alkhatib et al. ............. 709/245 |
| 2005/0111666 A1 | * | 5/2005 | Blom et al. .................. 380/277 |
| 2005/0182932 A1 | * | 8/2005 | Wheeler ..................... 713/168 |

OTHER PUBLICATIONS

US National Institute of Standards & Technology, "The Keyed-Hash Message Authentication Code (HMAC)", FIPS PUB 198, Mar. 2002.*

Bellare et al. "Message Authentication using Hash Functions—The HMAC Construction". RSA Laboratories' CryptoBytes, vol. 2, No. 1, Spring 1996.*

Bird R et al. International Association for Cryptologic Research: "Systematic Design of Two-Party Authentication Protocols*" Advances in Cryptology. Santa Barbara, Aug. 11-15, 1991, Proceedings of the Conference on Theory and Applications of Cryptographic Techniques (CRYPTO), Berlin, Springer, DE, Apr. 16, 1992, pp. 44-61, XP000269030.

"5C Digital Transmission Content Protection White Paper (Version 1.0)", Hitachi, Ltd., Intel Corporation, Matsushita Electric Industrial Co., Ltd., Sony Corporation, and Toshiba Corporation, Jul. 14, 1998.

Victor Shoup, "A Proposal for an ISO Standard for Public Key Encryption (version 2.1)", IBM Zurich Research Lab, Dec. 20, 2001.

Tatsuaki Okamoto, "Generic Conversions for Constructing IND-CCA2 Public-key Encryption in the Random Oracle Model", The 5$^{th}$ Workshop on Elliptic Curve Cryptography (ECC 2001).

M. Bellare and P. Rogaway, "Minimizing the Use of Random Oracles in Authenticated Encryption Schemes." ICICS'97, Nov. 1997.

* cited by examiner

KEY SHARING

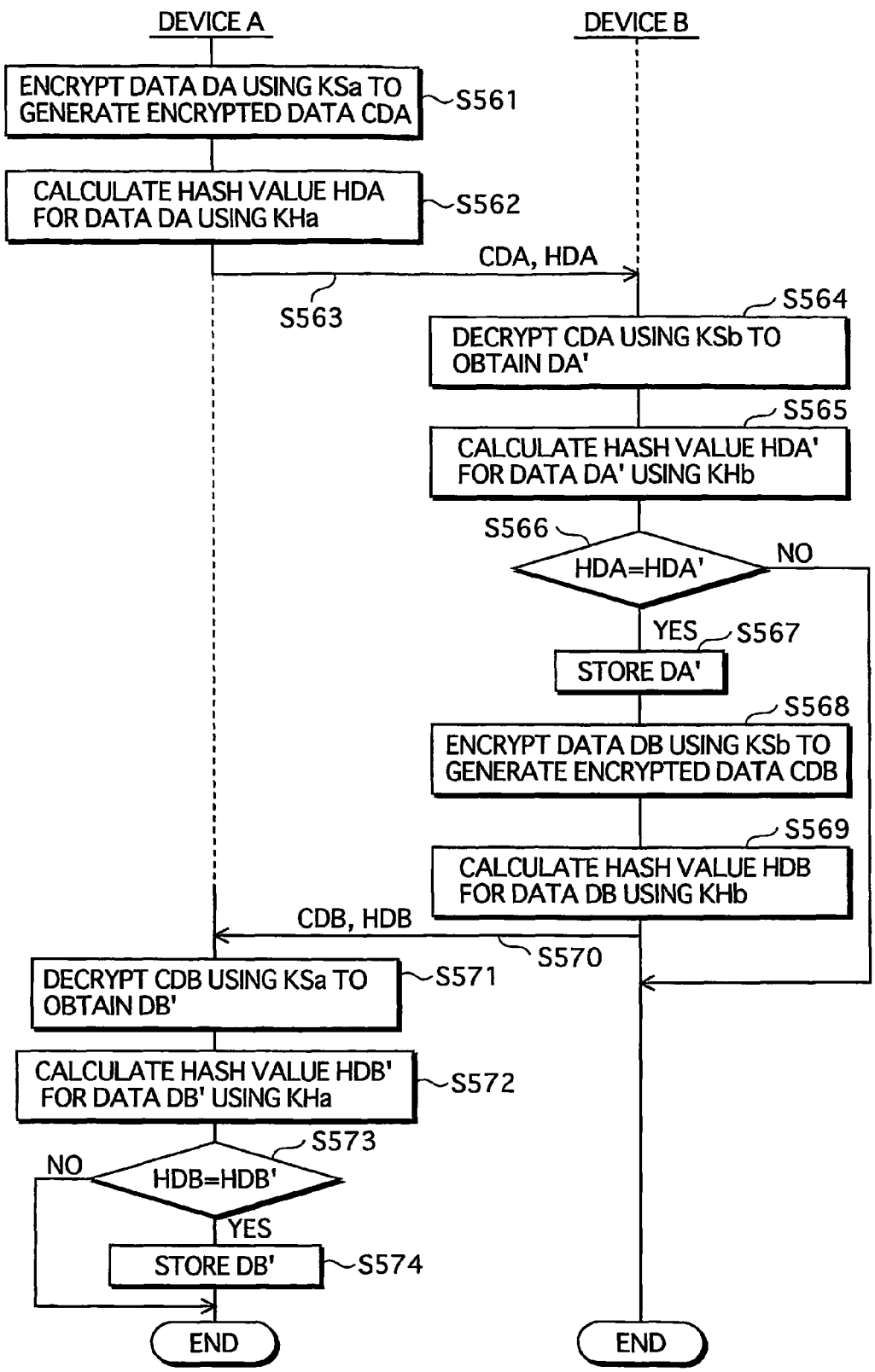

ENCRYPTED COMMUNICATION SYSTEM AND COMMUNICATION DEVICE

TECHNICAL FIELD

The present invention relates to encrypted communication technology for sharing keys and performing encrypted communication between devices.

BACKGROUND ART

In recent years, there is increasing opportunity for communicating via a network between household electronic appliances, mobile telephones and the like. In order to protect copyrighted works, prevent communication content leaks and so forth with devices such as these, encrypted communication using shared keys is performed after carrying out device authentication and key sharing.

In terms of authentication/key-sharing schemes, a specification called DTCP (Digital Transmission Content Protection) stipulates a scheme employed when AV devices are connected using an IEEE 1394 bus. With DTCP, challenge-response authentication using elliptic-curve DSA signatures is employed in the authentication scheme, and elliptic-curve DH key sharing is employed in the key-sharing scheme. Disclosure relating to DTCP can be found in a White Paper on the DTCP specification, while disclosure relating to challenge-response authentication, elliptic-curve DSA signatures, and elliptic-curve DH key sharing can be found in *Modern Cryptography* by Tatsuaki OKAMOTO and Hirosuke YAMAMOTO (Sangyo Tosho Publishing, 1997, available in Japanese only).

However, there is uncertainty in terms of the as yet unproven security of the authentication/key-sharing scheme stipulated by DTCP. Here, proof of security refers, in public key encryption, to proving that a user not in possession of a secret key is unable to decipher ciphertext, based on the assumption that the related mathematical problems are difficult to solve, and provides a guarantee of the security of public key encryption (see, for example, Mihir BELLARE, Phillip ROGAWAY, "Minimizing the use of random oracles in authenticated encryption schemes", 1997.

DISCLOSURE OF THE INVENTION

An object of the present invention, which was realized in view of the above problem, is to provide an encrypted communication system capable of sharing an encryption key with the utmost security.

To achieve the above object, the present invention is an encrypted communication system that includes a first device and a second device. The first device (i) encrypts a 1st key using a public key of the second device to generate 1st encrypted data, and transmits the 1st encrypted data to the second device, (ii) receives 2nd encrypted data from the second device, and decrypts the 2nd encrypted data using a secret key of the first device to obtain a 2nd key, and (iii) generates, based on the 1st and 2nd keys, a 1st encryption key for use in communication with the second device. The second device (i) encrypts a 3rd key using a public key of the first device to generate the 2nd encrypted data, and transmits the 2nd encrypted data to the first device, (ii) receives the 1st encrypted data from the first device, and decrypts the 1st encrypted data using a secret key of the second device to obtain a 4th key, and (iii) generates, based on the 3rd and 4th keys, a 2nd encryption key for use in communication with the first device. The first and second devices perform encrypted communication using the 1st and 2nd encryption keys.

With this structure, an encryption key is newly generated from two shared keys, thereby enabling communication data to be protected, since the encryption key used in encrypted data communication is kept safe even if one of the shared keys is disclosed to an unauthorized user.

Furthermore, it is possible to authenticate whether the device of the other communication party is an authorized device, depending on whether the encrypted data can be correctly decrypted to obtain two shared keys.

BRIEF DESCRIPTION OF THE DRAWINGS

FIG. 9 is a flowchart showing content data transmission operations performed by the content-data processing units.

BEST MODE FOR CARRYING OUT THE INVENTION

A preferred embodiment of the present invention is described below in detail with use of the drawings.

1. Structure of Encrypted Communication System 1

Figure 1:
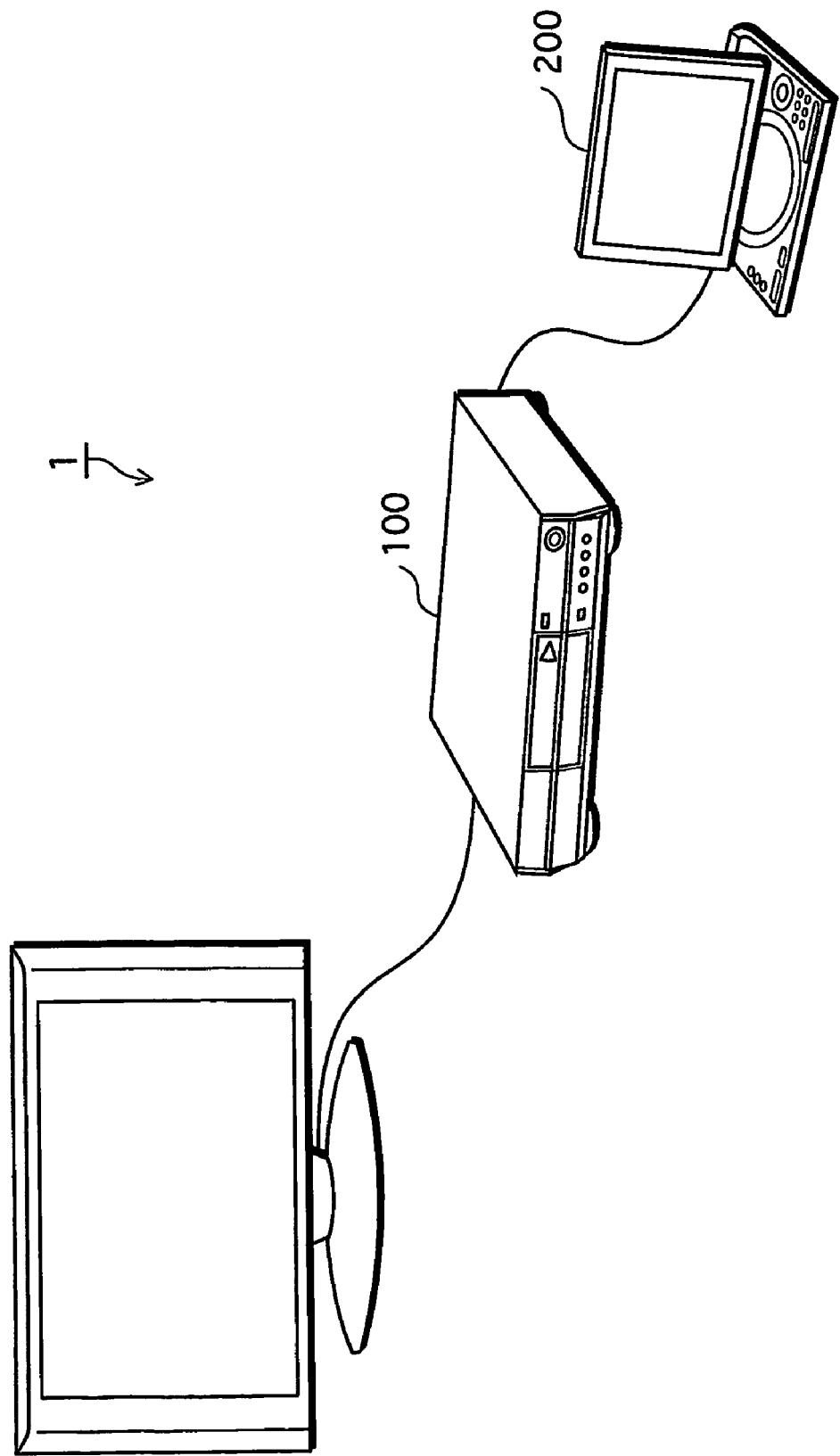
FIG. 1 shows an entire structure of an encrypted communication system 1.

Encrypted communication system 1 is, as shown in FIG. 1, constituted from a device A100 and a device B200. Devices A100 and B200 play content formed from video, audio and the like.

Encrypted communication system 1 performs authentication and key sharing between the devices, and performs encrypted communication using shared keys. The example given in the present embodiment involves content data being transmitted and received using shared keys.

1.1 Structure of Device A100

Figure 2:
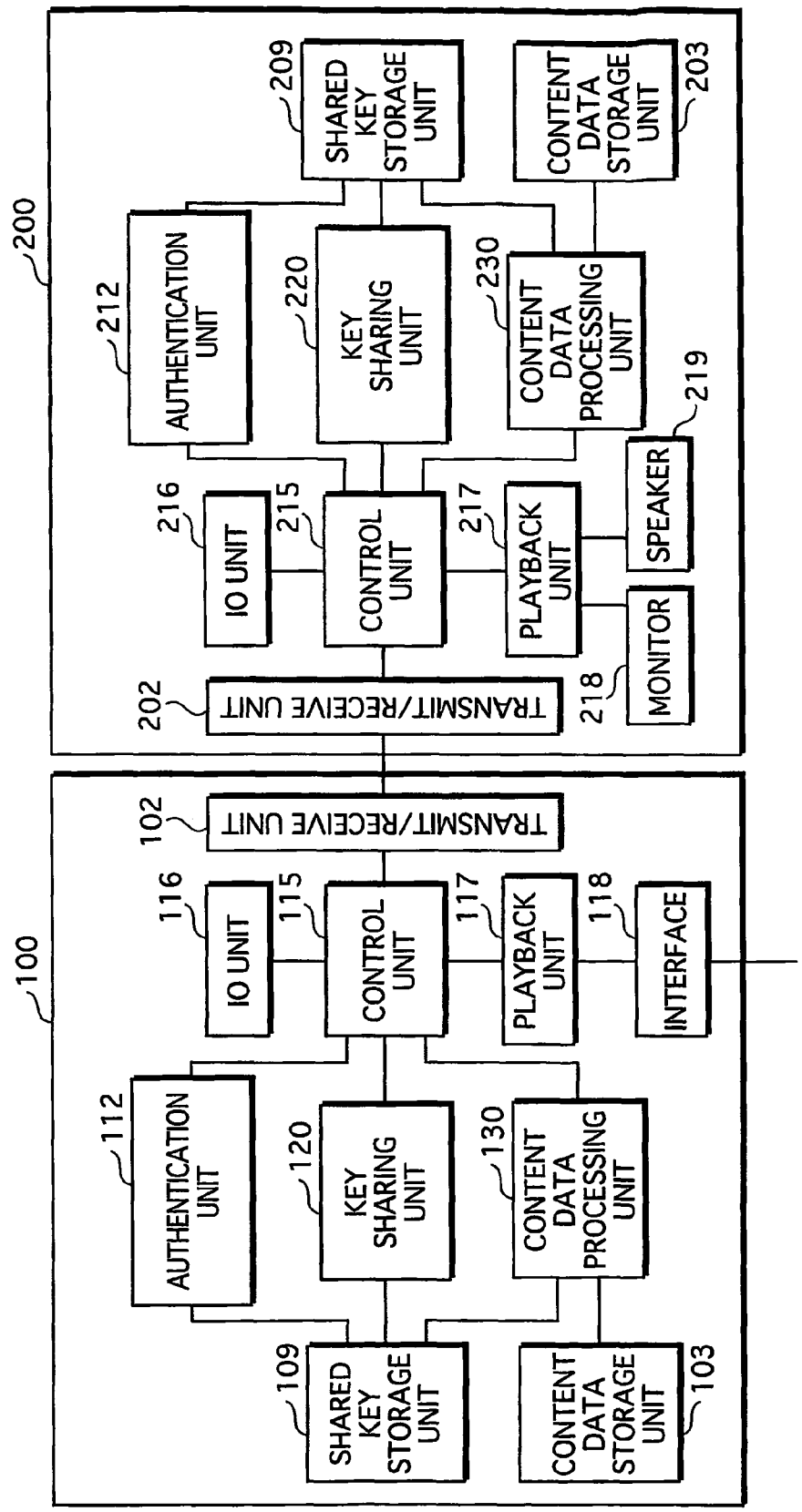
FIG. 2 is a block diagram showing a structure of a device A100 and a device B200.

Device A100 is, as shown in FIG. 2, constituted from a transmit/receive unit 102, a content-data storage unit 103, a shared-key storage unit 109, an authentication unit 112, a control unit 115, an input/output (IO) unit 116, a playback unit 117, an interface 118, a key-sharing unit 120, and a content-data processing unit 130.

Device A100 is, specifically, a computer system constituted from a microprocessor, ROM, RAM, hard-disk unit and the like. A computer program is stored in RAM or on the hard-disk unit. Device A100 achieves functions as a result of the microprocessor operating in accordance with the computer program.

Device A100 is capable of connecting an external device such as a monitor or speaker to interface 118, and when content data is played, video and audio signals are outputted via interface 118.

The various components are described next.

(1) Key Sharing Unit 120

Figure 3:
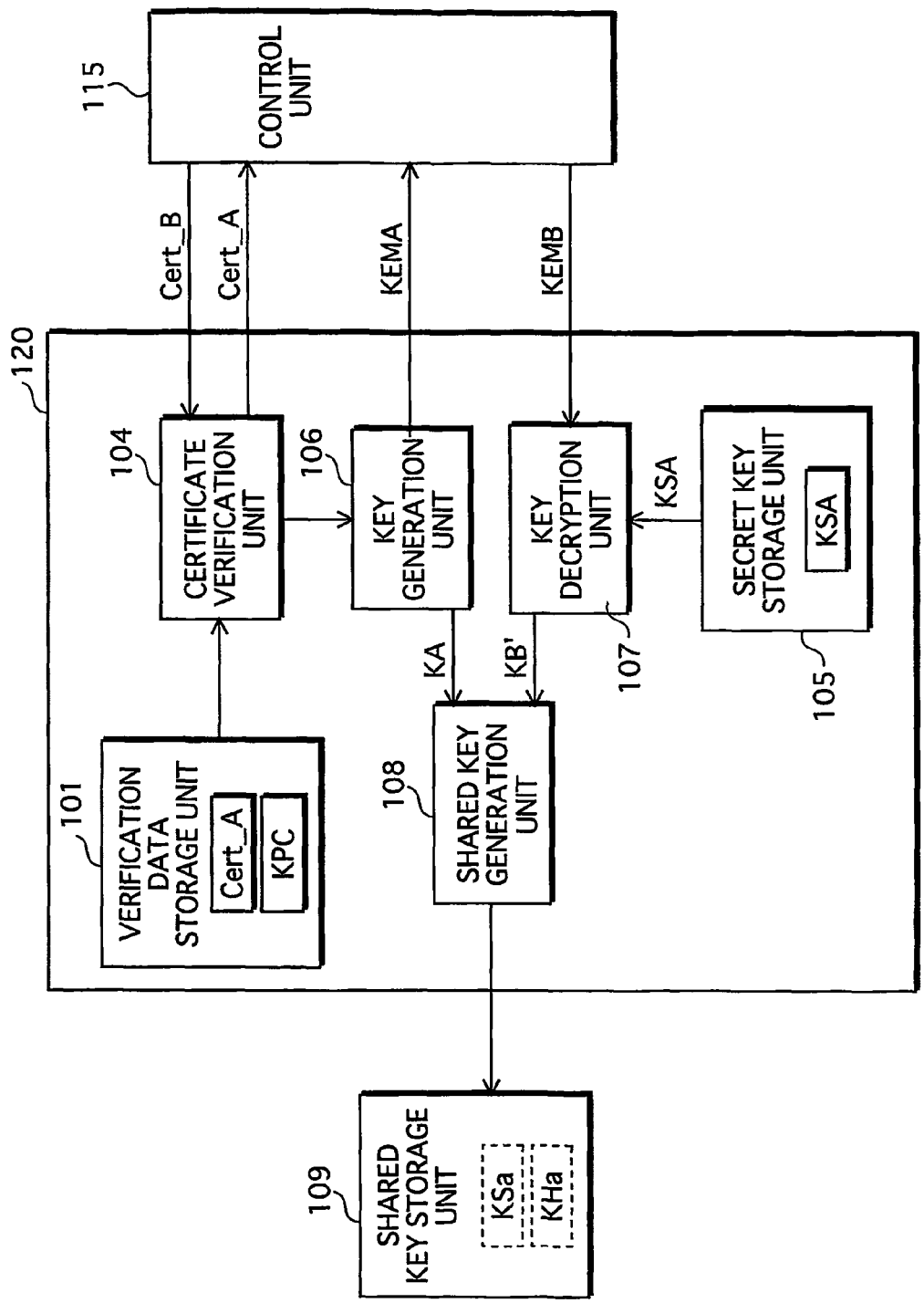
FIG. 3 is a block diagram showing a structure of a key-sharing unit 120 in device A100.

Unit 120 is, as shown in FIG. 3, constituted from a verification-data storage unit 101, a certificate verification unit 104, a secret-key storage unit 105, a key generation unit 106, a key decryption unit 107, and a shared-key generation unit 108.

Unit 120 delivers a key KA from device A100 to device B200, receives a key KB delivered from device B200 to device A100, and shares keys KA and KB. From shared keys KA and KB, unit 120 generates a shared key KS for use in encrypted communication, and a shared key KH for use in tamper detection of communication data.

(a) Verification-Data Storage Unit 101

Unit 101 stores a public key certificate Cert_A of device A100 and a public key KPC of a CA (Certification Authority).

Certificate Cert_A includes a public key KPA and a signature SKPA.

Public key KPA is issued to device A100 by the CA. Signature SKPA is also issued by the CA, and certifies that public key KPA is an authentic public key. To generate signature SKPA, a signature generation algorithm S1 is performed on public key KPA using a secret key KSC of the CA that corresponds to public key KPC.

Here, the CA is a trustworthy third party organization that issues public key certificates certifying the authenticity of the public keys of devices belonging to encrypted communication system 1. Note that signature generation algorithm S1 may, for example, be an RSA signature, an elliptic-curve DSA signature, or the like. Modern Cryptography (see above) goes into detail about these algorithms.

(b) Secret-Key Storage Unit 105

Unit 105 stores a secret key KSA. Secret key KSA corresponds to public key KPA, and is generated in advance by the CA.

(c) Certificate Verification Unit 104

Unit 104 verifies whether public key certificates received from other devices are authentic certificates issued by the CA.

On receipt of a public key certificate Cert_B of device B200, unit 104 removes a signature SKPB and a public key KPB included in certificate Cert_B, under the control of control unit 115. Unit 104 reads public key KPC from verification-data storage unit 101, and performs a signature verification algorithm V1 on signature SKPB using public keys KPC and KPB to verify the signature. If verification is successful, unit 104 outputs public key KPB included in the certificate to key generation unit 106. If verification is not successful, unit 104 ends the processing.

(d) Key Generation Unit 106

Unit 106 receives public key KPB of device B200 from certificate verification unit 104, and generates key KA and key information KEMA based on a key encapsulation mechanism.

Here, the key encapsulation mechanism is an algorithm for delivering a shared key from a device on the transmitting end ("transmitter") to a device on the receiving end ("receiver") using public key encryption. The transmitter inputs a public key pk of the receiver into a public key encryption algorithm E to generate a ciphertext C and a shared key K, and sends ciphertext C to the receiver. The receiver inputs secret key sk of the receiver and ciphertext C into a public key decryption algorithm D to derive the same shared key K as the transmitter.

Communication data is then encrypted with common key encryption using shared key K.

The fact that any unauthorized action by the transmitter is suppressed because of the transmitter being unable to create the shared key artificially, despite the transmission of information being performed unidirectionally from the transmitter to the receiver, is a feature not found in conventional key delivery schemes.

Key generation unit 106 generates key KA and key information KEMA equating respectively to shared key K and ciphertext C in the key encapsulation mechanism, with public key KPB of device B200 as the input. Unit 106 outputs key KA and key information KEMA to shared-key generation unit 108 and control unit 115, respectively.

Note that detailed disclosure relating to key encapsulation mechanisms can be found in Victor SHOUP, "A proposal for an ISO standard for public key encryption (version 2.1)" (20 Dec. 2001, URL: http://shoup.net/papers/iso-2_1.pdf, viewed: Sep. 29, 2002).

(e) Key Decryption Unit 107

Unit 107 receives key information KEMB sent from device B200, under the control of control unit 115. Key information KEMB equates to ciphertext C in the key encapsulation mechanism.

Unit 107 reads secret key KSA from secret-key storage unit 105. Secret key KSA equates to the secret key of the receiver in the key encapsulation mechanism. Unit 107 decrypts key information KEMA with key information KEMA and secret key KSA as inputs to obtain a key KB', and outputs key KB' to shared-key generation unit 108.

(f) Shared-Key Generation Unit 108

Unit 108 receives key KA and key KB' respectively from key generation unit 106 and key decryption unit 107, under the control of control unit 115. Unit 108 concatenates keys KA and KB' in the stated order to generate key data KA∥KB'. Unit 108 performs a hash function on key data KA∥KB' to generate a hash value H. Unit 108 then divides hash value H, with the upper bits as a shared key KSa for use in encryption, and the remainder as a shared key KHa for use in hashing.

Unit 108 stores shared keys KSa and KHa in shared-key storage unit 109.

(2) Shared-Key Storage Unit 109

Unit 109 stores shared keys KSa and KHa generated by shared-key generation unit 108.

(3) Authentication Unit 112

Unit 112 performs mutual authentication with the device of another communication party (device B200 in the given example), using shared key KSa stored in shared-key storage unit 109. Here, unit 112 may perform challenge-response authentication, for example.

The detailed processing is described in a later section.

(4) Content-Data Processing Unit 130

Figure 4:
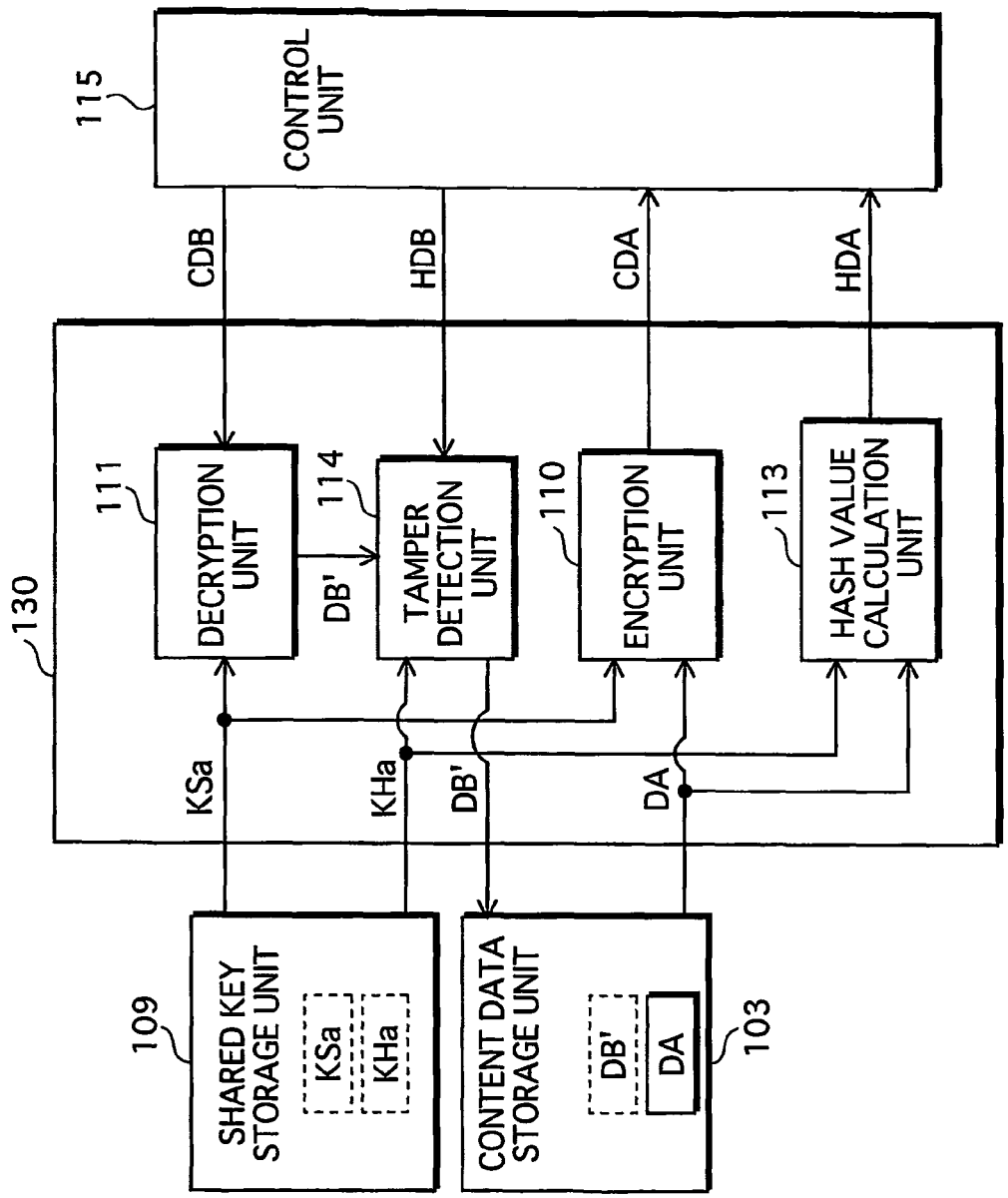
FIG. 4 is a block diagram showing a structure of a content-data processing unit 130 in device. A100.

Unit 130 is, as shown in FIG. 4, constituted from an encryption unit 110, a decryption unit 111, a hash-value calculation unit 113 and a tamper detection unit 114, and performs processing related to transmission/reception of content data.

(a) Encryption Unit 110

Unit 110 reads shared key KSa used in encryption and content data DA respectively from shared-key storage unit 109 and content-data storage unit 103, under the control of control unit 115. Unit 110 performs an encryption algorithm E1 on content data DA using shared key KSa, thereby encrypting content data DA to generate encrypted data CDA=Enc (KSa,DA) Enc(KSa,DA) is a ciphertext generated by encrypting content data DA with common key encryption using shared key KSa.

Here, encryption algorithm E1 is, for example, an AES (Advanced Encryption Standard) algorithm. Description of AES, being well known, is omitted.

Unit 110 outputs encrypted data CDA to control unit 115.

(b) Hash-Value Calculation Unit 113

Unit 113 reads shared key KHa used in hashing and content data DA respectively from shared-key storage unit 109 and content-data storage unit 103, under the control of control unit 115. Unit 113 calculates a hash value HDA=Hash(KHa, DA) for content data DA using shared key KHa. Here, Hash (KHa,DA) signifies a hash value of content data DA calculated with a keyed hash function using shared key KHa. Note that Hash(KHa,DA) may be set as Hash(KHa,DA)=SHA1 (KHa∥DA). Here, SHA1(x) is the SHA1 hash function value of x, and "∥" indicates a concatenation operation.

Unit 113 outputs hash value HDA to control unit 115.

(c) Decryption Unit 111

Unit 111 receives encrypted data CDB=Enc(KSb,DB) and reads shared key KSa used in encryption from shared-key storage unit 109, under the control of control unit 115. Unit 111 performs a decryption algorithm D1 on encrypted data CDB using shared key KSa, thereby decrypting encrypted data CDB to obtain plaintext content data DB'. Note that decryption algorithm D1 performs the opposite processing to encryption algorithm E1.

Here, if the shared keys are correctly generated by shared-key generation unit 108, shared key KSa stored in shared-key storage unit 109 will be the same as shared key KSb held by device B200. In other words, if these two shared key are the same, it is possible to obtain content data DB' identical to the original content data DB, using shared key KSa held by device A100.

Unit 111 outputs content data DB' to tamper detection unit 114.

(d) Tamper Detection Unit 114

Unit 114 judges whether content data DB' decrypted by decryption unit 111 has been tampered with.

On receipt of a hash value HDB, and content data DB' from decryption unit 111, unit 114 reads shared key KHa used in hashing from shared-key storage unit 109, under the control of control unit 115. Unit 114 calculates a hash value HDB'=Hash(KHa,DB') for content data DB', using shared key KHa.

Unit 114 then compares calculated hash value HDB' with received hash value HDB. If the hash values match, unit 114 judges there to be no tampering, and stores content data DB' in content-data storage unit 103. If the hash values do not match, unit 114 judges there to be tampering, and does not store content data DB'.

(5) Content-Data Storage Unit 103

Unit 103 stores content data DA.

Unit 103 also stores content data DB' written into unit 103 by content-data processing unit 130.

Here, content data DA and DB' is, for example, digital data such as video, audio and the like.

(6) Control Unit 115, IO Unit 116, Transmit/Receive Unit 102

IO unit 116 receives instruction information by user operations, and outputs received information to control unit 115.

Transmit/receive unit 102 performs transmission and reception of data between device B200 and control unit 115.

Control unit 115 performs processing for key sharing, mutual authentication, content data transmission/reception and playback, based on instruction information from the user received by IO unit 116.

Control unit 115, on receipt of instruction information indicating key sharing, controls key sharing unit 120 to generate shared key KSa used in encryption and shared key KHa used in hashing. On receipt of key information KEMA from key generation unit 106, unit 115 transmits the received key information to device B200 via transmit/receive unit 102. On receipt of key information KEMB via transmit/receive unit 102, unit 115 outputs the received key information to key decryption unit 107.

On receipt of instruction information indicating mutual authentication, control unit 115 has authentication unit 112 perform mutual authentication.

On receipt of instruction information indicating the transmission/reception of content data, control unit 115 controls content-data processing unit 130 in order to perform transmission/reception of content data. On receipt of encrypted data CDA and hash value HDA respectively from encryption unit 110 and hash-value calculation unit 113 in the transmission of content data DA, unit 115 transmits the encrypted data and hash value to device B200 via transmit/receive unit 102. On receipt of encrypted data CDB and hash value HDB from device B200 via transmit/receive unit 102, unit 115 outputs the encrypted data and hash value to decryption unit 111 and tamper detection unit 114, respectively.

On receipt of instruction information indicating the playback of content data DA or DB', control unit 115 outputs the indicated content data to playback unit 117, and controls playback unit 117 to play the content data.

(7) Playback Unit 117, Interface 118

Interface 118 is connected to an external device, examples of which include a television, a monitor, and a speaker etc.

Playback unit 117 generates video signals and audio signals from content data, and outputs the signals to an external device via interface 118.

1.2 Structure of Device B200

Device B200 is, as shown in FIG. 2, constituted from a transmit/receive unit 202, a content-data storage unit 203, a shared-key storage unit 209, an authentication unit 212, a control unit 215, an input/output (IO) unit 216, a playback unit 217, a monitor 218, a speaker 219, a key-sharing unit 220, and a content-data processing unit 230.

Device B200 is, similar to device A100, a computer system constituted from a microprocessor, ROM, RAM, hard-disk unit and the like. A computer program is stored in RAM or on the hard-disk unit. Device B200 achieves functions as a result of the microprocessor operating in accordance with the computer program.

The various components are described next.

(1) Key Sharing Unit 220

Figure 5:
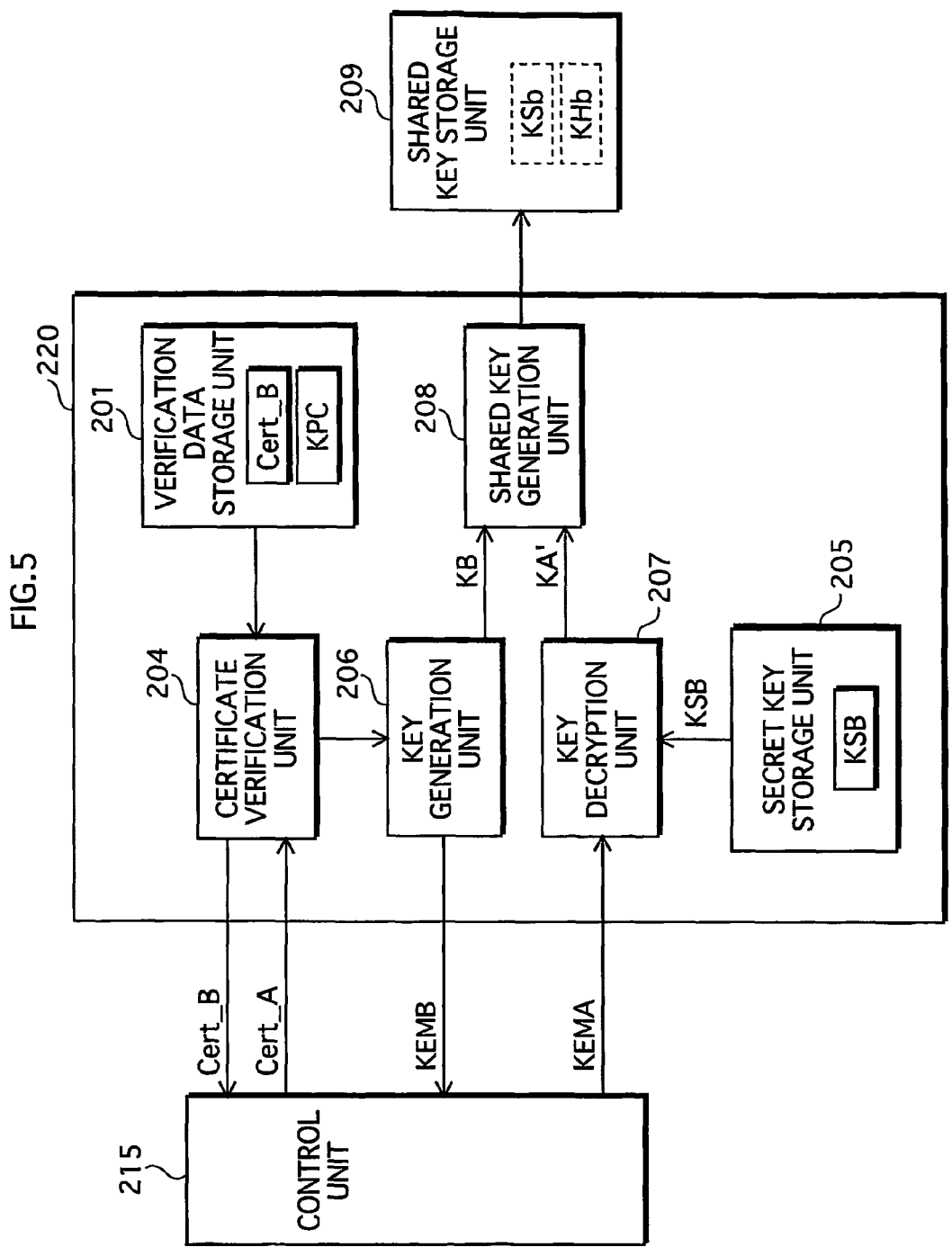
FIG. 5 is a block diagram showing a structure of a key-sharing unit 220 in device B200.

Unit 220 is, as shown in FIG. 5, constituted from a verification-data storage unit 201, a certificate verification unit 204, a secret-key storage unit 205, a key generation unit 206, a key decryption unit 207, and a shared-key generation unit 208.

(a) Verification-Data Storage Unit 201

Unit 201 stores public key certificate Cert_B of device B200 and public key KPC of the CA.

Certificate Cert_B includes signature SKPB and public key KPB of device B200. Signature SKPB, which certifies that public key KPB is an authentic public key, is signature data generated by performing signature generation algorithm S1 on public key KPB using secret key KSC of the CA.

(b) Secret-Key Storage Unit 205

Unit 205 stores secret key KSB corresponding to public key KPB.

(c) Certificate Verification Unit 204

Unit 204, on receipt of public key certificate Cert_A of device A100, removes signature SKPA and public key KPA included in certificate Cert_A, under the control of control unit 215. Unit 204 reads public key KPC from verification-data storage unit 201, and performs signature verification algorithm V1 on signature SKPA using public keys KPC and KPA to verify the signature. If verification is successful, unit 204 outputs public key KPA to key generation unit 206. If verification is not successful, unit 204 ends the processing.

(d) Key Generation Unit 206

Unit 206 generates key KB and key information KEMB using the key encapsulation mechanism. Unit 206 outputs Key KB and key information KEMB to shared-key generation unit 208 and control unit 215, respectively.

(e) Key Decryption Unit 207

Unit 207 receives key information KEMA from device A100 and reads secret key KSB from secret-key storage unit 205, under the control of control unit 215. Unit 207 decrypts key information KEMB with key information KEMB and secret key KSB as inputs to obtain a key KA', and outputs key KA' to shared-key generation unit 208.

(f) Shared-Key Generation Unit 208

Unit 208 receives key KB and key KA' from key generation unit 206 and key decryption unit 207, respectively. Unit 208, similar to shared-key generation unit 108, generates shared key KSb used in encryption and shared key KHb used in hashing, based on keys KA' and KB. Unit 208 stores shared keys KSb and KHb in shared-key storage unit 209.

(2) Shared-Key Storage Unit 209

Unit 209 stores shared keys KSb and KHb generated by shared-key generation unit 208.

(3) Authentication Unit 212

Unit 212 performs mutual authentication with authentication unit 112, using shared key KSb stored in shared-key storage unit 209.

(4) Content-Data Processing Unit 230

Figure 6:
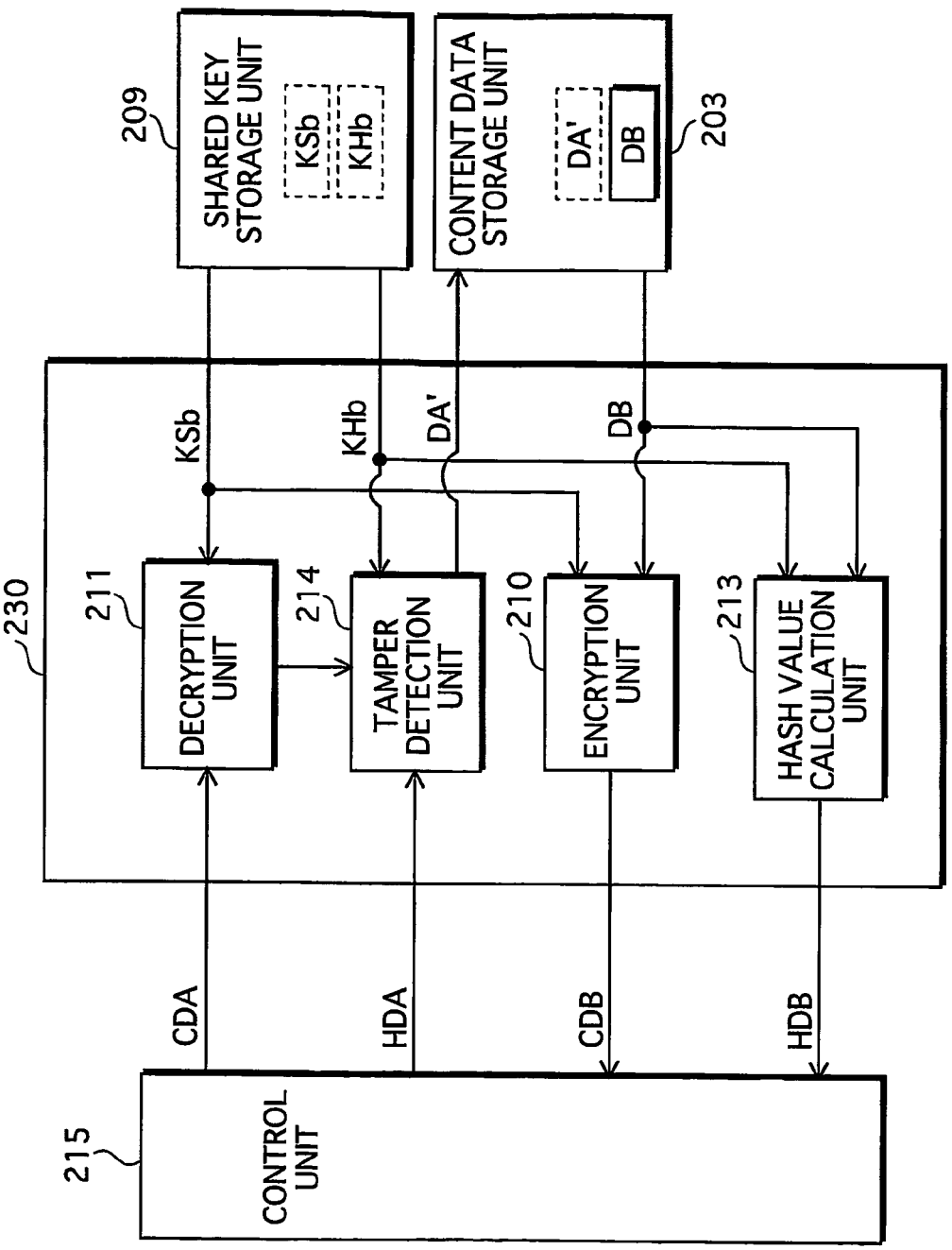
FIG. 6 is a block diagram showing a structure of a content-data processing unit 230 in device B200.

Unit 230 is, as shown in FIG. 6, constituted from an encryption unit 210, a decryption unit 211, a hash-value calculation unit 213, and a tamper detection unit 214.

(a) Encryption Unit 210

Unit 210 reads content data DB and shared key KSb used in encryption respectively from content-data storage unit 203 and shared-key storage unit 209, under the control of control unit 215. Unit 210 performs encryption algorithm E1 on content data DB using shared key KSb, thereby encrypting content data DB to generate encrypted data CDB=Enc (KSb, DB). Unit 210 outputs encrypted data CDB to control unit 215.

(b) Hash-Value Calculation Unit 213

Unit 213 reads shared key KHb for using in hashing and content data DB respectively from shared-key storage unit 209 and content-data storage unit 203, under the control of control unit 215. Unit 213 calculates a hash value HDB=Hash (KHb,DB) for content data DB using shared key KHb, and outputs hash value HDB to control unit 215.

(c) Decryption Unit 211

Unit 211, on receipt of encrypted data CDA=Enc(KSa, DA), reads shared key KSb used in encryption from shared-key storage unit 209, and decrypts encrypted data CDA using shared key KSb to obtain plaintext content data DA', under the control of control unit 215.

Unit 211 outputs content data DA' to tamper detection unit 214.

(d) Tamper Detection Unit 214

Unit 214 receives hash value HDA, and content data DA' from decryption unit 211, under the control of control unit 215. Unit 214 reads shared key KHb used in hashing from shared-key storage unit 209. Unit 214 calculates a hash value HDA'=Hash(KHb,DA') for content data DA', using shared key KHb.

Unit 214 then compares calculated hash value HDA' with received hash value HDA. Unit 214 stores content data DA' in content-data storage unit 203 if the hash values match, and does not store content data DA' if the hash values do not match.

(5) Content-Data Storage Unit 203

Unit 203 stores content data DB.

Unit 203 also stores content data DA' written into unit 203 by content-data processing unit 230.

(6) Control Unit 215, IO Unit 216, Transmit/Receive Unit 202

IO unit 216 outputs instruction information received by external input to control unit 215, and transmit/receive unit 202 performs transmission and reception of data between device A100 and control unit 215.

Control unit 215, similar to control unit 115, performs processing for key sharing, mutual authentication, content data transmission/reception and playback, based on instruction information from the user received by IO unit 216.

(7) Playback Unit 217, Monitor 218, Speaker 219

Playback Unit 217 generates video signal and audio signal from content data, and outputs the video and audio signals to monitor 218 and speaker 219, respectively.

2. Key Encapsulation Mechanism

With the key encapsulation mechanism, information is transmitted from the transmitter to receiver, and the receiver generates shared keys based on the received information.

PSEC-KEM is described here as an exemplary key encapsulation mechanism. Note that detailed disclosure relating to PSEC-KEM can be found in Tatsuaki OKAMOTO, "Generic conversions for constructing IND-CCA2 public-key encryption in the random oracle model" ($5^{th}$ Workshop on Elliptic Curve Cryptography, ECC 2001, 30 Oct. 2001.

(a) The transmitter and receiver have the following PSEC-KEM system parameters.

elliptic curve: E; points of order n on elliptic curve: P
hash function: G, H

Note that description relating to elliptic curves, orders and hash functions is omitted here, given the detail disclosure that can be found in *Modern Cryptography* (see above).

(b) Public key pk and secret key sk of the receiver are generated in PSEC-KEM as follows.

Element x of Zn is chosen randomly, and W=x*P is generated.

Here, Zn is a set formed from $\{0, 1, \ldots, n-1\}$, and x*P expresses points on the elliptic curve obtained by adding points P on the elliptic curve x number of times. Note that description relating to the methods for adding points on elliptic curves can be found in *Modern Cryptography* (see above).

Public key pk is set to W (=x*P), and secret key sk is set to x.

(c) The transmitter acquires public key pk of the receiver, inputs public key pk into a public key encryption algorithm KemE, and outputs shared key K and ciphertext C. Public key encryption algorithm KemE is described next.

Element s of Zn is generated randomly.

G(s) is generated and divided into G(s)=a||K. Here, || indicates bit concatenation, while the division of G(s) into G(s)=a||K indicates that the upper plurality of bits in G(s) is set to a, and the remaining bits are set to K.

R=a*P and Q=a*W is generated.

With the input of hash function H set as (a*P||a*W), and having the value of H(a*P||a*W) act upon the randomly generated element s, V=s XOR H(R||Q) is generated. Here, XOR indicates an exclusive OR operation.

Shared key K and ciphertext C=(R,v) are outputted.

The transmitter transmits ciphertext C to the receiver.

(d) The receiver receives ciphertext C from the transmitter, inputs ciphertext C=(R,v) as well as public key pk and secret key sk of the receiver into a public key decryption algorithm KemD, and outputs shared key K. Public key decryption algorithm KemD is described next.

Using secret key sk (=x) from R=a*P,
Q=x*R=x*(a*P)=a*(x*P)=a*W is derived.
s'=v XOR H(R∥Q) (=v XOR H(a*P∥a*W)) is generated.
G(s') is generated, and G(s') is divided into G(s')=a∥K.

The receiver checks whether R=a*P is established. If established, shared key K is outputted.

(e) Thus, it is possible for the transmitter and the receiver respectively using public key encryption algorithm KemE and public key decryption algorithm KemD to input the same values into hash function G and to derived the same shared key K. As a result, a receiver possessing the secret key is able to derive a shared key K identical to that derived by the transmitter.

(f) On the other hand, other receivers that do not know secret key sk are unable to calculate Q=a*W (=(ax) P) from R=a*P because of not knowing secret key sk (=x), even if they acquire public key k and receive ciphertext C, and are thus unable to derive a shared key K identical to that derived by the transmitter. This is because a receiver that does not know secret key sk is only able to rely on public key pk, and thus has to use W=x*P of public key pk instead of secret key sk (=x) in calculating Q. However, generally, the derivation of Q=a*W (=(ax)*P) from a*P and W=x*P, referred to as the elliptic-curve Diffie-Hellman problem, is difficult to calculate as long as the values of a and x remain unknown. (See, for example, Neal KOBLITZ, "*Algebraic Aspects of Cryptography: Algorithms and Computation in Mathematics Vol.* 3, pp. 132-133, Springer-Verlag, 1998.)

(g) If the elliptic-curve Diffie-Hellman problem is difficult to solve with the above PSEC-KEM algorithms, this proves that receivers that do not know the secret key are unable to obtain shared key K. The security of other KEM algorithms in PSEC-KEM such as RSA-KEM (see Victor SHOUP, "A proposal for an ISO standard for public key encryption" mentioned above) and the like, for example, is also proven, based on similarly difficult mathematical problems, making it feasible to share keys KA and KB using other KEM algorithms.

3. Operations of Encrypted Communication System 1

3.1 Generation of Shared Keys

Figure 7:
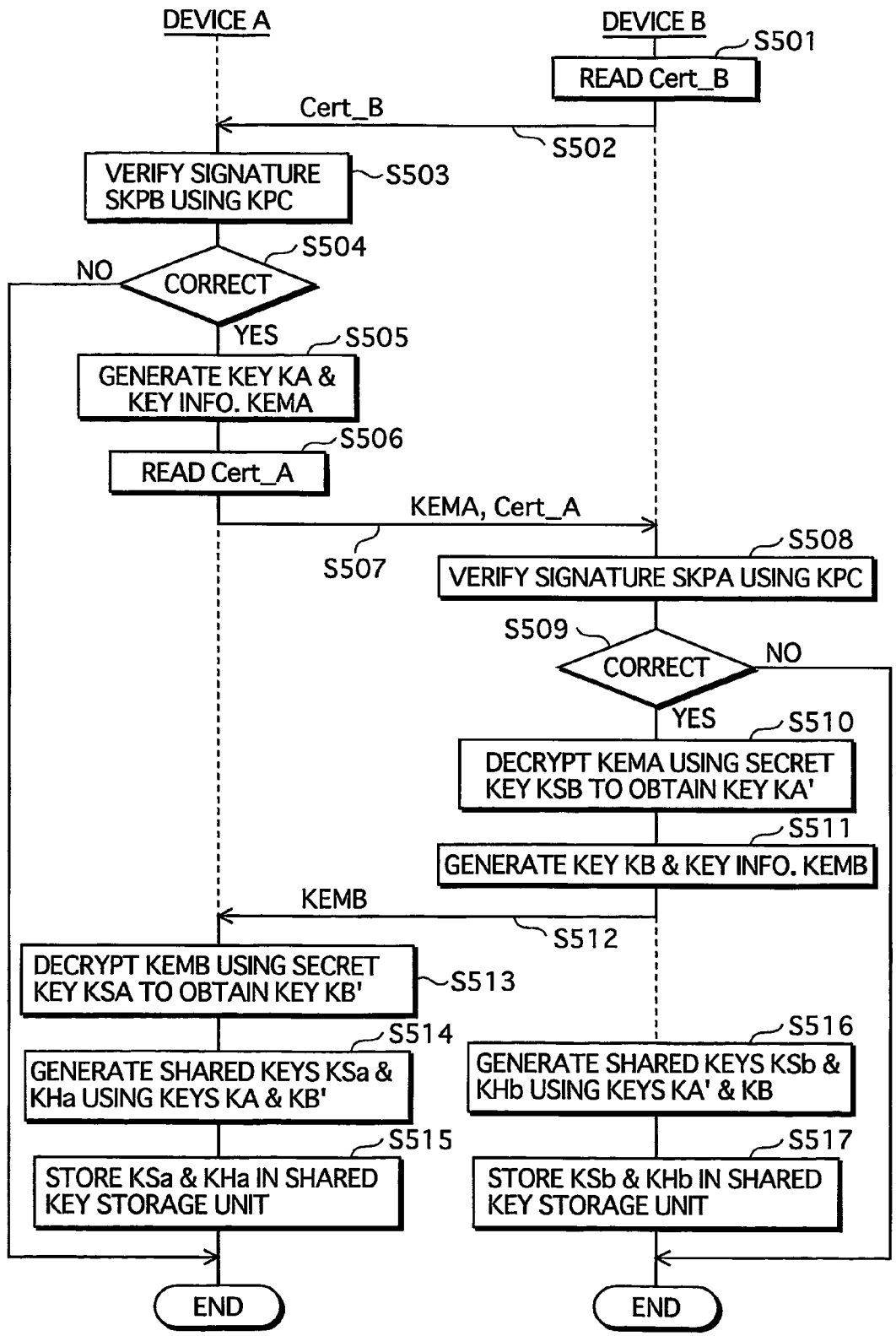
FIG. 7 is a flowchart showing key-sharing operations performed by the key-sharing units.

Operations to generate share keys KS and KH using the key encapsulation mechanism between devices A100 and B200 are described with reference to FIG. 7.

Certificate verification unit 204 reads public key certificate Cert_B from verification-data storage unit 201 (step S501). Control unit 215 transmits certificate Cert_B to device A100 via transmit/receive unit 202 (step S502).

Control unit 115 outputs certificate Cert_B received via transmit/receive unit 102 to certificate verification unit 104. On receipt of certificate Cert_B, unit 104 removes signature SKPB and public key KPB, and reads public key KPC from verification-data storage unit 101. Unit 104 then verifies signature SKPB using public key KPC (step S503). If the verification result shows signature SKPB to be correct (step S504=YES), unit 104 outputs public key KPB to key generation unit 106. If the verification result shows signature SKPB to be incorrect (step S504=NO), unit 104 ends the processing.

Key generation unit 106 generates key KA and key information KEMA based on the key encapsulation mechanism (step S505). Unit 106 outputs key KA and key information KEMA to shared-key generation unit 108 and control unit 115, respectively. Certificate verification unit 104 reads public key certificate Cert_A of device A100 from verification-data storage unit 101 (step S506), and outputs certificate Cert_A to control unit 115.

Control unit 115 transmits key information KEMA and certificate Cert_A to device B200 via transmit/receive unit 102 (step S507).

Control unit 215 of device B200, on receipt of key information KEMA and certificate Cert_A, outputs the received key information and certificate to key decryption unit 207 and certificate verification unit 204, respectively.

Certificate verification unit 204 receives certificate Cert_A, removes signature SKPA and public key KPA, and reads public key KPC from verification-data storage unit 201. Unit 204 then verifies signature SKPA using public key KPC (step S508). If the verification result shows signature SKPA to be correct (step S508=YES), unit 204 outputs public key KPA to key generation unit 206. If the verification result shows signature SKPA to be incorrect (step S508=NO), unit 204 ends the processing.

Key decryption unit 207 receives key information KEMA from control unit 215, and reads secret key KSB from secret-key storage unit 205. Unit 207 decrypts key information KEMA using secret key KSB to obtain key KA' (step S510).

Next, key generation unit 206 generates key KB and key information KEMB based on the key encapsulation mechanism (step S511). Unit 206 outputs key KB and key information KEMB to shared-key generation unit 208 and control unit 215, respectively. Control unit 215 transmits key information KEMB to device A100 via transmit/receive unit 202 (step S512).

Control unit 115 of device A100, on receipt of key information KEMB, outputs the received key information to key decryption unit 107. Unit 107 receives key information KEMB and reads secret key KSA from secret-key storage unit 105. Unit 107 decrypts key information KEMB using secret key KSA to obtain key KB' (step S513). Unit 107 outputs key KB' to shared-key generation unit 108.

Shared-key generation unit 108, on receipt of key KA and key KB' respectively from key generation unit 106 and key decryption unit 107, generates shared key KSa used in encryption and shared key KHa used in hashing, using keys KA and KB' (step S514), and stores the shared keys in shared-key storage unit 109 (step S515).

Similarly, shared-key generation unit 208, on receipt of key KB and key KA' respectively from key generation unit 206 and key decryption unit 207, generates shared key KSb used in encryption and shared key KHb used in hashing, using keys KB and KA' (step S516), and stores the shared keys in shared-key storage unit 209 (step S517).

Keys KA and KB can be shared in this way, since devices A100 and B200 will only be able to correctly decrypt key information received from the other device to acquire keys if they are authentic devices.

The devices, if both authentic, will be able to generate identical shared keys KSa and KSb for use in encryption, and identical shared keys KHa and KHb for use in hashing.

3.2 Mutual Authentication

Figure 8:
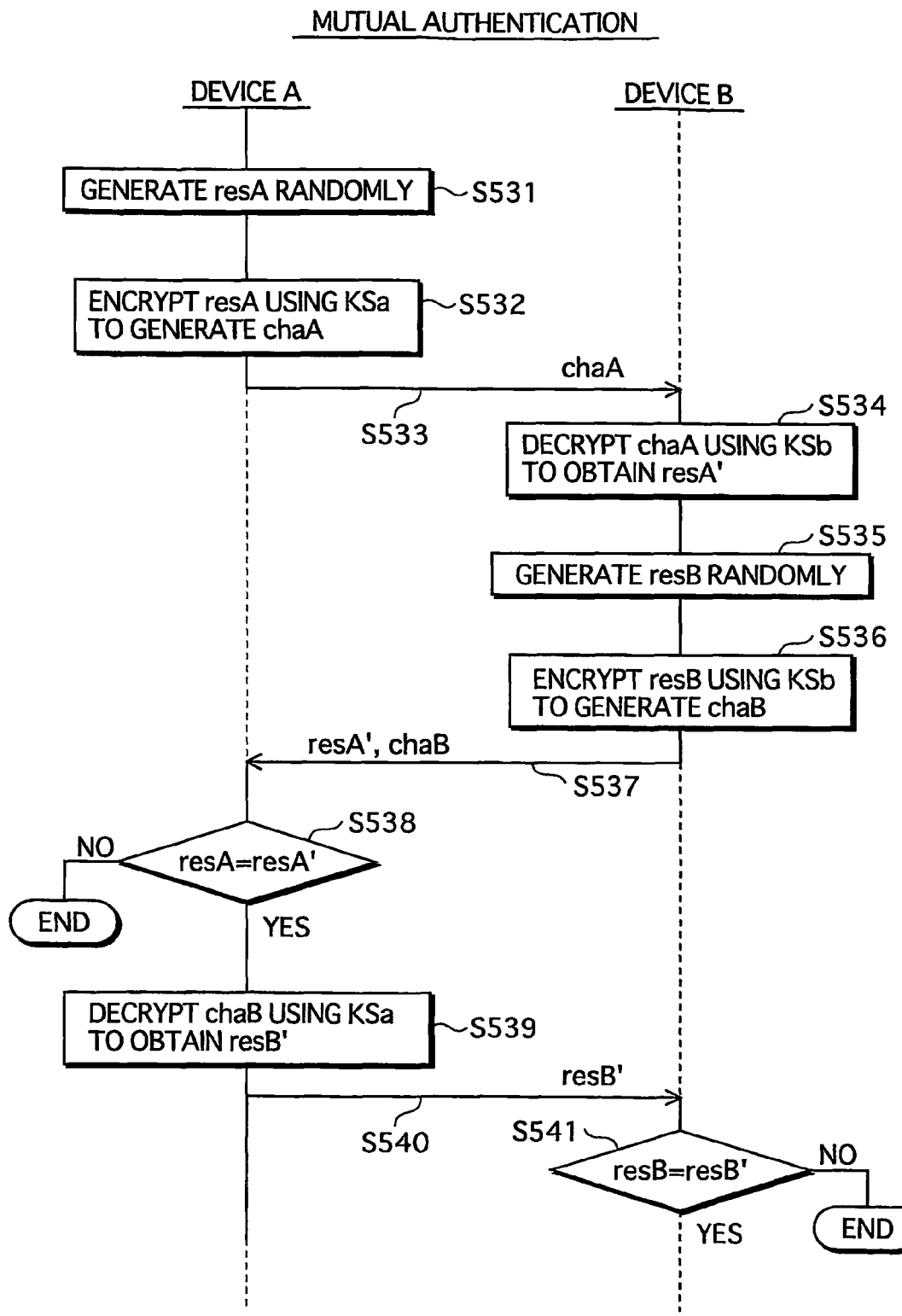
FIG. 8 is a flowchart showing mutual authentication operations performed by authentication units.

Operations to perform mutual authentication between devices A100 and B200 before transmitting content data are described with reference to FIG. 8.

Authentication unit 112 of device A100 randomly generates random number resA (step S531). Unit 112 encrypts random number resA using shared key KSa used in encryption to generate chaA (step S532). Unit 112 outputs chaA to device B200 via transmit/receive unit 102 (step S533).

Authentication unit 212 of device B200, on receipt of chaA via transmit/receive unit 202, decrypts chaA using shared key KSb used in encryption to obtain resA' (step S534). Next, unit 212 randomly generates random number resB (step S535). Unit 212 encrypts random number resB using shared key KSb to generate chaB (step S536). Unit 212 transmits chaB and resA' to device A100 (step S537).

Authentication unit 112 of device A100, on receipt of chaB and resA', judges whether resA' matches resA generated at step S531 (step S538). If not matched (step S538=NO), unit 112 judges authentication to have failed, and ends the processing. If matched (step S538=YES), unit 112 continues the processing, having viewed the authentication as being successful. Unit 112 decrypts chaB using shared key KSa to obtain resB' (step S539), and transmits resB' to device B200 (step S540).

Authentication unit 212 of device B200 receives resB' and judges whether resB' matches resB generated at step S535 (step S541). If not matched (step S541=NO), unit 212 judges authentication to have failed, and ends the processing. If matched (step S541=YES), unit 212 continues the processing.

Devices A100 and B200 mutually perform device authentication as described above. If key sharing is performed correctly and shared keys KSa and KSb used in encryption are identical, the other device can, at this time, be authenticated as being an authentic device with which a key was correctly shared.

3.3 Transmission of Content Data

Operations to transmit content data DA and DB between devices A100 and B200 are described with reference to FIG. 9.

Encryption unit 110 reads content data DA and shared key KSa used in encryption respectively from content-data storage unit 103 and shared-key storage unit 109, under the control of control unit 115. Unit 110 encrypts content data DA using shared key KSa to generate encrypted data CDA (step S561). Unit 110 outputs encrypted data CDA to control unit 115.

Hash-value calculation unit 113 reads content data DA and shared key KHa used in hashing respectively from content-data storage unit 103 and shared-key storage unit 109, and calculates hash value HDA for content data DA using shared key KHa, under the control of control unit 115 (step S562). Unit 113 outputs hash value HDA to control unit 115.

Control unit 115, on receipt of encrypted data CDA and hash value HDA, transmits the encrypted data and hash value to device B200 via transmit/receive unit 102 (step S563).

Decryption unit 211 of device B200 receives encrypted data CDA from control unit 215, and reads shared key KSb used in encryption from shared-key storage unit 209. Unit 211 decrypts encrypted data CDA using shared key KSb to obtain plaintext content data DA' (step S564). Unit 211 outputs content data DA' to tamper detection unit 214.

Tamper detection unit 214, on receipt of hash value HDA and content data DA' respectively from control unit 215 and decryption unit 211, reads shared key KHb used in hashing from shared-key storage unit 209. Unit 214 generates hash value HDA' for content data DA' using shared key KHb (step S565). Unit 214 judges whether the generated hash value HDA' matches the received hash value HDA (step S566), and if not matched (step S566=NO), unit 214 ends the processing, having viewed there to be tampering. If matched (step S566=YES), unit 214 stores content data DA' in content-data storage unit 203, having viewed there to be no tampering (step S567).

Encryption unit 210 reads content data DB and shared key KSb respectively from content-data storage unit 203 and shared-key storage unit 209, under the control of control unit 215. Unit 210 encrypts content data DB using shared key KSb to generate encrypted data CDB (step S568). Unit 210 outputs encrypted data CDB to control unit 215.

Hash-value calculation unit 213 reads content data DB and shared key KHb respectively from content-data storage unit 203 and shared-key storage unit 209, under the control of control unit 215. Unit 213 generates hash value HDB for content data DB using shared key KHb (step S569). Unit 213 outputs hash value HDB to control unit 215.

Control unit 215, on receipt of encrypted data CDB and hash value HDB, transmits the encrypted data and hash value to device A100 via transmit/receive unit 202 (step S570).

Decryption unit 111 of device A100, on receipt of encrypted data CDB, reads shared key KSa from shared-key storage unit 109, under the control of control unit 115. Unit 111 decrypts encrypted data CDB using shared key KSa to obtain plaintext content data DB' (step S571). Unit 111 outputs content data DB' to tamper detection unit 114.

Tamper detection unit 114 receives content data DB' from decryption unit 111 and reads shared key KHa from shared-key storage unit 109. Unit 114 calculates hash value HDB' for content data DB' using shared key KHa (step S572). Unit 114 judges whether the generated hash value HDB' matches the received hash value HDB (step S573), and if not matched (step S573=NO), unit 114 ends the processing, having viewed there to be tampering. If matched (step S573=YES), unit 114 stores content data DB' in content-data storage unit 103, having viewed there to be no tampering (step S574).

4. Variations

The present invention, while having been described above based on a preferred embodiment, is of course not limited to this embodiment. The following variations are also included.

(1) While content data in the preferred embodiment is transmitted bidirectionally from device A100 to device B200 and from device B200 to device A100, data transmission may be unidirectional from one device to the other.

(2) While key sharing, mutual authentication, and content data transmission are described consecutively in the preferred embodiment, other processing may be interposed therebetween. For example, processing to confirm device functions (music playback, movie playback, broadcast reception functions etc.) may be included.

(3) While public key certificates, public keys and content data are described above as being stored in separate storage units, they may be stored in the same storage unit, or the data may be stored separately in a plurality of storage units.

(4) While content data is described above as being stored in a storage unit after being received, content data may be outputted on a screen if image data, or outputted through speakers if music data.

(5) While public key certificates are described above as including a public key and a corresponding signature, other data such as ID information, for example, may also be appended. Also, the data marked as signature data may be combined with the public key or with other data; that is, concatenated with ID information, for example.

(6) While shared keys KS and KH for respective use in encryption and hashing are, in the preferred embodiment, generated by dividing a hash value for data obtained from the concatenation of keys KA and KB, the present invention is not limited to this configuration.

Shared keys KS and KH may be generated either by dividing the result of an exclusive OR performed on keys KA and KB, or based on at least part of both keys KA and KB.

(7) The algorithms used in calculating hash values and generating ciphertexts are not limited to those disclosed in the preferred embodiment. The calculations may, of course, be performed using other algorithms.

(8) The present invention may be a method of the above. The method may be a computer program realized by a computer, or a digital signal formed from the program.

The present invention may be a computer-readable recording medium storing the program or the digital signal, examples of which include a floppy disk, hard disk, CD-ROM, MO, DVD, DVD-ROM, DVD-RAM, BD (blu-ray disc), and semiconductor memory etc. The present invention may also be the program or digital signal recorded on such a recording medium.

The program or digital signal recorded on such a recording medium may be transmitted via a network or the like, representative examples of which include a telecommunication circuit, a wireless or cable communication circuit, and the Internet.

The present invention may alternatively be a computer system that includes a microprocessor and a memory, the program being stored in the memory and the microprocessor operating in compliance with the program.

The present invention also may be implemented in another independent computer system, by transferring the program or the digital signal to the other computer system, either recorded on the recording medium or via a network or the like.

(9) The present invention may be any combination of the above embodiment and variations.

5. Summary

As described above, the present invention is an encrypted communication system that includes a first device and a second device. The first device (i) encrypts a 1st key using a public key of the second device to generate 1st encrypted data, and transmits the 1st encrypted data to the second device, (ii) receives 2nd encrypted data from the second device, and decrypts the 2nd encrypted data using a secret key of the first device to obtain a 2nd key, and (iii) generates, based on the 1st and 2nd keys, a 1st encryption key for use in communication with the second device. The second device (i) encrypts a 3rd key using a public key of the first device to generate the 2nd encrypted data, and transmits the 2nd encrypted data to the first device, (ii) receives the 1st encrypted data from the first device, and decrypts the 1st encrypted data using a secret key of the second device to obtain a 4th key, and (iii) generates, based on the 3rd and 4th keys, a 2nd encryption key for use in communication with the first device. The first and second devices perform encrypted communication using the 1st and 2nd encryption keys.

Also, the present invention is a communication device for performing encrypted communication with another device using a shared key. The communication device includes a data generation unit operable to encrypt a 1st key using a public key that corresponds to a secret key held by the other device to generate 1st encrypted key data, and transmit the 1st encrypted key data to the other device; a decryption unit operable to receive, from the other device, 2nd encrypted key data generated by the other device encrypting a 3rd key using a public key of the communication device, and decrypt the 2nd encrypted key data using a secret key of the communication device to obtain a 2nd key; a key generation unit operable to generate an encryption key based on the 1st and 2nd keys; and a communication unit operable to perform encrypted communication with the other device using the encryption key.

With these structures, an encryption key is newly generated from two shared keys, thereby enabling communication data to be protected, since the encryption key used in encrypted data communication is kept safe even if one of the shared keys is disclosed to an unauthorized user. Also, it was necessary with conventional key sharing to securely hold two shared keys, but with the present invention it is sufficient to securely hold only the encryption key, thus enabling memory usage to be decreased. Furthermore, the authenticity of the other device in the communication can be indirectly authenticated, according to whether the other device can correctly decrypt the encrypted data to correctly generate the encryption key.

Here, the key generation unit may further generate a hash key based on the 1st and 2nd keys, and the communication unit may includes a calculation subunit operable to calculate, using the hash key, a hash value for transmission data; an encryption subunit operable to encrypt the transmission data using the encryption key to generate encrypted data; and a transmission subunit operable to transmit the hash value and the encrypted data to the other device.

Also, the key generation unit may further generate a hash key based on the 1st and 2nd keys. The communication unit may includes a receiving subunit operable to receive, from the other device, encrypted data generated by encrypting data using an encryption key held by the other device, and a 1st hash value calculated for the data using a hash key held by the other device; a decryption subunit operable to decrypt the encrypted data using the encryption key to obtain plaintext data; and a judging subunit operable to calculate a 2nd hash value for the plaintext data using the hash key, and judge whether the first and second hash values match. The communication device may further include a usage unit operable to use the plaintext data if the hash values are judged to match, and to suppress use of the plaintext data if the hash values are judged not to match.

With this structure, the transmitter transmits a hash value calculated for the original data using a shared hash key, while the receiver calculates a hash value for received data using the shared hash key and compares the received and calculated hash values, thus making it possible to detect whether the data has been tampered with. Also, the fact that identical hash values cannot be calculated if the devices have not shared keys, means that the data can only be used by devices that have shared keys and been indirectly authenticated.

Here, the communication device may further include an authentication unit operable to authenticate the other device, using the encryption key.

Also, the authentication unit may (i) generate a 1st authentication value, encrypt the 1st authentication value using the encryption key to generate a 1st encrypted value, and transmit the 1st encrypted value to the other device, and (ii) receive, from the other device, a 2nd authentication value generated by decrypting the 1st encrypted value using an encryption key held by the other device, and judge whether the 1st and 2nd authentication values match. The communication device may further include a communication unit operable to perform communication with the other device if the authentication values are judged to match.

Also, the authentication unit may receive, from the other device, a 3rd encrypted value generated by encrypting a 3rd authentication value using the encryption key held by the other device, decrypt the 3rd encrypted value using the encryption key to obtain a 4th authentication value, and transmit the 4th authentication value to the other device. The communication unit may perform the communication if the other device judges the 3rd and 4th authentication values to match.

With these structures, it is possible to authenticate devices that have correctly shared keys.

Here, the data generation unit may encrypt the 1st key based on a key encapsulation mechanism to generate the 1st encrypted key data, and the decryption unit may decrypt the 2nd encrypted key data based on a key decryption mechanism to obtain the 2nd key.

With this structure, proof of security based on difficult mathematical problems is guaranteed by using a key encapsulation mechanism, thereby guaranteeing the security of a communication device pertaining to the present invention.

INDUSTRIAL APPLICABILITY

The present invention can be used administratively as well as repetitively and continually in software industries that provide software such as contents and computer programs obtained by digitalizing movies, music and other copyrighted works. Furthermore, an encrypted communication system and a communication device pertaining to the present invention can be produced and retailed in manufacturing industries for electronic appliances and the like.

The invention claimed is:

1. A communication device for performing encrypted communication with another device, comprising:
   a data generation unit operable to encrypt a first key using a public key of the other device to generate first encrypted key data, and transmit the first encrypted key data to the other device;
   a decryption unit operable to receive, from the other device, second encrypted key data generated by the other device encrypting a third key using a public key of the communication device, and decrypt the second encrypted key data using a private key of the communication device to obtain a second key;
   a key generation unit operable to perform a predetermined operation using the first and second keys, generate a part of a result of the predetermined operation as a first encryption key and generate another part of the result as a first hash key; and
   a communication unit operable to encrypt first transmission data using the first encryption key to generate first encrypted data, apply a one-way operation to the first transmission data using the first hash key to calculate a first detection value for tamper detection to be performed on the first encrypted data by the other device, and transmit the first encrypted data and the first detection value to the other device, wherein
   said data generation unit divides an operation result obtained by applying a one-way operation to a first seed value to generate a first coefficient and a first key, generates first encrypted key data by performing encryption using the first seed value and the first coefficient based on a public key of the other device, and transmits the first encrypted key data to the other device,
   said decryption unit receives, from the other device, the second encrypted key data, generates a second seed value from the second encrypted key data based on a private key of the communication device, divides an operation result obtained by applying the one-way operation to the second seed value to generate a second coefficient and a second key, checks the second encrypted key data using the second coefficient, and when the second encrypted key data is correct, outputs the second key identical to a third key of the other device, and the other device
   divides an operation result obtained by applying the one-way operation to a third seed value to generate a third coefficient and the third key, generates the second encrypted key data by performing encryption using the third seed value and the third coefficient based on a public key of the communication device, and transmits the second encrypted key data to the communication device,
   receives, from the communication device, the first encrypted key data, generates a fourth seed value from the first encrypted key data based on a private key of the other device, divides an operation result obtained by applying the one-way operation to the fourth seed value to generate a fourth coefficient and a fourth key, checks the first encrypted key data using the fourth coefficient, and when the first encrypted key data is correct, outputs the fourth key identical to the first key,
   generates a second encryption key based on the third and fourth keys, and
   performs the encrypted communication with the communication device using the second encryption key.

2. The communication device of claim 1, wherein
   a base element and the public key of the other device are defined in a group, the public key of the other device having been calculated by performing a power operation using the private key of the other device and the base element,
   said data generation unit of the communication device divides the operation result obtained by applying the one-way operation to the first seed value which is a random number to generate the first coefficient and the first key, calculates a first element in the group by performing a power operation using the first coefficient and the base element, calculates a second element in the group by performing a power operation using the first coefficient and the public key of the other device, calculates a first verification value by performing a logical operation using the first seed value, the first element, and the second element, and outputs the first element and the first verification value as the first encrypted key data,
   the other device acquires the first element and the first verification value as the first encrypted key data, calculates a third element in the group by performing a power operation using the private key of the other device and the first element, calculates a second verification value by performing the logical operation using the first verification value, the first element, and the third element, divides an operation result obtained by applying the one-way operation to the second verification value to generate a fourth efficient and a fourth key, compares an operation result of a power operation using the fourth coefficient and the base element, and the first element, and when the operation result and the first element match, recognizes the fourth key identical to the first key,
   the base element and the public key of the communication device are defined in the group, the public key of the communication device having been calculated by performing a power operation using the private key of the communication device and the base element, the other device divides the operation result obtained by applying the one-way operation to the second seed value which is a random number to generate the third coefficient and the third key, calculates a fourth element in the group by performing a power operation using the third coefficient and the base element, calculates a fifth element in the group by performing a power operation using the third coefficient and the public key of the communication device, calculates a third verification value by performing the logical operation using the second seed value, the fourth element, and the fifth element, and outputs the fourth element and the third verification value as the second encrypted key data, said decryption unit of the other device acquires the fourth element and the third verification value as the second encrypted key data, calculates a sixth element in the group by performing a power operation using the private key of the communication device and the fourth element, calculates a fourth verification value by performing the logical operation using the third verification value, the fourth element, and the sixth element, divides an operation result obtained by applying the one-way operation to the fourth verification value to generate the second efficient and the second key, compares an operation result of a power operation using the second coefficient and the base element, and the fourth element, and when the operation result and the fourth element match, recognizes the second key identical to the third key.

3. The communication device of claim 2, wherein when P is a base point as the base element on an elliptic curve E as the group, x is the private key of the other device, W=x*P is the public key of the other device, and "*" represents an operand indicating the power operation which is multiplication of a point on the elliptic curve E, said data generation unit of the communication device
  (a) generates the first seed value $s_1$ which is a random number;
  (b) calculates a hash value $G(s_1)$ of the first seed value $s_1$;
  (c) divides the hash value $G(s_1)$ to generate the first coefficient a and the first key;
  (d) calculates a point R=a*P as the first element and a point Q=a*W as the second element, on the elliptic curve E;
  (e) performs an exclusive OR using the first seed value $s_1$ and a hash value obtained by applying a hash function to a result of concatenating the points R and Q to obtain the first verification value v; and
  (f) outputs the point R and the first verification value v as the first encrypted key data, the other device
  (g) acquires the point R and the first verification value v;
  (h) calculates point Q'=x*R as the third element on the elliptic curve E;
  (i) performs an exclusive OR using the first verification value v and a hash value obtained by applying a hash function to a result of concatenating the points R and Q', to obtain the second verification value $s'_1$;
  (j) calculates a hash value $G(s'_1)$ of the second verification value $s'_1$;
  (k) divides the hash value $G(s'_1)$ to generate the fourth coefficient a' and the fourth key;
  (l) judges whether R=a'*P is established or not; and
  (m) when judging that R=a'*P is established, recognizes the fourth key identical to the first key, and when P is the base point as the base element on the elliptic curve E as the group, x is the private key of the communication device, W=x*P is the public key of the communication device, the other device
  (a) generates the third seed value $s_2$ which is a random number;
  (b) calculates a hash value $G(s_2)$ of the third seed value $s_2$;
  (c) divides the hash value $G(s_2)$ to generate the third coefficient a and the third key;
  (d) calculates the point R=a*P as the fourth element and the point Q=a*W as the fifth element, on the elliptic curve E;
  (e) performs an exclusive OR using the third seed value $s_2$ and a hash value obtained by applying a hash function to a result of concatenating the points R and Q to obtain the third verification value v; and
  (f) outputs the point R and the third verification value v, the decryption unit of the communication device
  (g) acquires the point R and the third verification value v;
  (h) calculates the point Q'=x*R as the sixth element on the elliptic curve E;
  (i) performs an exclusive OR using the third verification value v and a hash value obtained by applying a hash function to a result of concatenating the points R and Q' to obtain the fourth verification value $s'_2$;
  (j) calculates a hash value $G(s'_2)$ of the fourth verification value $s'_2$;
  (k) divides the hash value $G(s'_2)$ to generate the second coefficient a' and the second key;
  (l) judges whether R=a'*P is established or not; and
  (m) when judging that R=a'*P is established, recognizes the fourth key.

* * * * *